(12) United States Patent
Gadkaree et al.

(10) Patent No.: US 8,524,632 B2
(45) Date of Patent: *Sep. 3, 2013

(54) HIGH-CAPACITANCE AND LOW-OXYGEN POROUS CARBON FOR EDLCS

(75) Inventors: Kishor Purushottam Gadkaree, Painted Post, NY (US); Jia Liu, Painted Post, NY (US)

(73) Assignee: Corning Incorporated, Corning, NY (US)

(*) Notice: Subject to any disclaimer, the term of this patent is extended or adjusted under 35 U.S.C. 154(b) by 385 days.

This patent is subject to a terminal disclaimer.

(21) Appl. No.: 12/970,028

(22) Filed: Dec. 16, 2010

(65) Prior Publication Data

US 2011/0183841 A1    Jul. 28, 2011

Related U.S. Application Data

(60) Provisional application No. 61/297,478, filed on Jan. 22, 2010.

(51) Int. Cl.
    *C01B 31/12* (2006.01)
(52) U.S. Cl.
    USPC ............ 502/432; 502/424; 502/425; 502/426
(58) Field of Classification Search
    USPC ................................. 502/424, 425, 426, 432
    See application file for complete search history.

(56) References Cited

U.S. PATENT DOCUMENTS

| | | | | |
|---|---|---|---|---|
| 5,039,651 | A | 8/1991 | Kosaka et al. | 502/424 |
| 5,710,092 | A | 1/1998 | Baker | 502/416 |
| 6,514,907 | B2 * | 2/2003 | Tsutsumi et al. | 502/417 |
| 8,198,210 | B2 * | 6/2012 | Gadkaree et al. | 502/417 |
| 2002/0036883 | A1 | 3/2002 | Noguchi et al. | 361/502 |
| 2002/0048144 | A1 | 4/2002 | Sugo et al. | 361/502 |
| 2009/0097188 | A1 | 4/2009 | Mitchell | 361/502 |

FOREIGN PATENT DOCUMENTS

| | | |
|---|---|---|
| EP | 0 467 486 A1 | 7/1991 |
| EP | 1 211 702 A1 | 6/2002 |
| GB | 630 886 A | 12/1946 |
| JP | 5101980 A | 4/1993 |
| JP | 7201674 A | 8/1995 |
| JP | 10116755 A | 5/1998 |
| JP | 2004047613 A | 2/2004 |
| JP | 2004067498 A | 3/2004 |
| JP | 2007302512 A | 11/2007 |
| WO | WO 2008053919 | 5/2008 |

OTHER PUBLICATIONS

Ahmadpour, et al., The Preparation of Active Carbons From Coal by Chemical and Physical Activation, Elsevier Science Ltd., Carbon vol. 34, No. 4, pp. 471-479, (1996).

Ahmadpour, et al, The Preparation of Activated Carbon From Macadamia Nutshell by Chemical Activation, Elsevier Science Ltd., Carbon vol. 35, No. 12, pp. 1723-1732, (1997).

H. P. Boehm, Some Aspects of the Surface Chemistry of Carbon Blacks and Other Carbons, Elsevier Science Ltd., Carbon, vol. 32, No. 5, pp. 759-769, (1994).

Cadek, et al., Bio-Based Materials for Supercapacitor, *ISGL Group—The Carbon Company*.

Kadlec, et al., Structure of Pores of Active Carbons Prepared by Water-Vapour and Zinc-Dichloride Activation, Pergamon Press. Carbon, vol. 8, pp. 321-331, (1970).

Pandolfo, et al., Review—Carbon Properties and Their Role in Supercapacitors, Elsevier, Journal of Power Sources 157, 11-27, (2006).

Teng, et al., Preparation of Porous Carbons From Phenol-Formaldehyde Resins With Chemical and Physical Activation, Pergamon, Carbon 38, 817-824, (2000).

Tennison, S.R., Phenolic-Resin-Derived Activated Carbons, Elsevier Science Ltd., Applied Catalysis A: General 173, 289±311, (1998).

Treusch, et al., Basic Properties of Specific Wood-Based Materials Carbonised in a Nitrogen Atmosphere, Wood Sci Technol 38: 323-333, (2004).

Yue, et al., Preparation of Fibrous Porous Materials by Chemical Activation 1. ZNCL Activation of Polymer-Coated Fibers, Elsevier Science Ltd., Carbon 40, 1181-1191, (2002).

Nakamura, et al., "Influence of Physical Properties of Activated Carbons on Characteristics on Electric Double-Layer Capacitors", Journal of Power Sources, vol. 60, (1996), pp. 225-231.

van der Merwe, et al., "A Study of Ignition of Metal Impregnated Carbons: The Influence of Oxygen Content in the Activated Carbon Matrix", Journal of Colloid and Interface Science, 282, (2005), pp. 102-108.

Velasco, et al., "Role of Activated Carbon Features on the Photocatalytic Degradation of Phenol", Applied Surface Science, 256, (2010), pp. 5254-5258.

Mestre, et al., "Waste-Derived Activated Carbons for Removal of Ibuprofen From Solution: Role of Surface Chemistry and Pore Structure", Bioresource Technology, 100, (2009), pp. 1720-1726.

Li, et al., "Novel Activated Carbons as Electrode Materials for Electrochemical Capacitors From a Series of Starch", Solid State Ionics, 179, (2008), pp. 269-273.

Evans, et al., "The Production of Chemically-Activated Carbon", Carbon, 37, (1999), pp. 269-274.

Namane, et al., "Determination of the Adsorption Capacity of Activated Carbon Made From Coffee Grounds by Chemical Activation With $ZnCl_2$ and $H_3PO_4$", Journal of Hazardous Materials, B119, (2005), pp. 189-194.

\* cited by examiner

*Primary Examiner* — Stuart Hendrickson

(74) *Attorney, Agent, or Firm* — Michael W. Russell

(57) ABSTRACT

A method for producing a low oxygen content activated carbon material includes heating a natural, non-lignocellulosic carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, removing the inorganic compound from the first carbon material to produce a second carbon material, and heating the second carbon material in an inert or reducing atmosphere to form the low oxygen content activated carbon material. The activated carbon material is suitable to form improved carbon-based electrodes for use in high energy density devices.

12 Claims, No Drawings

US 8,524,632 B2

HIGH-CAPACITANCE AND LOW-OXYGEN POROUS CARBON FOR EDLCS

CLAIMING BENEFIT OF PRIOR FILED APPLICATION

This application claims the benefit of U.S. Provisional Application No. 61/297,478, filed on Jan. 22, 2010. The content of this document and the entire disclosure of publications, patents, and patent documents mentioned herein are incorporated by reference.

BACKGROUND AND SUMMARY

The present disclosure relates generally to activated carbon materials and more specifically to activated carbon materials having low-oxygen content and high-capacitance. The disclosure relates also to high power density energy storage devices having carbon-based electrodes comprising such activated carbon materials.

Energy storage devices such as ultracapacitors may be used in many applications such as where a discrete power pulse is required. Example applications range from cell phones to hybrid vehicles. Energy storage devices typically comprise a porous separator and/or an organic electrolyte sandwiched between a pair of carbon-based electrodes. The energy storage is achieved by separating and storing electrical charge in the electrochemical double layer at the interfaces between the electrolyte and the electrodes. Important characteristics of these devices are the energy density and power density that they can provide, which are both largely determined by the properties of the carbon-based electrodes.

Carbon-based electrodes suitable for incorporation into high energy density devices are known. The carbon materials, which form the basis of such electrodes, can be made from natural or synthetic precursor materials. Known natural precursor materials include coals, nut shells, and biomass, while synthetic precursor materials typically include phenolic resins. With both natural and synthetic precursors, carbon materials can be formed by carbonizing the precursor and then activating the resulting carbon. The activation can comprise physical (e.g., steam) or chemical activation.

A property of the carbon that can influence its success when incorporated into high energy density devices such as electric double layer capacitors (EDLCs) is the material's specific capacitance. Higher specific capacitance generally results in a higher volumetric energy density of the resulting device. In addition to the foregoing, reducing the oxygen-content in the carbon materials can beneficially increase the cycle life of the device. Specifically, during conventional processes for synthesizing activated carbon, oxygen may be incorporated into the carbon in the form of surface functional groups, which can adversely affect the properties of the carbon. Accordingly, it would be an advantage to provide activated carbon materials as well as methods for making activated carbon materials having a high specific capacitance and low-oxygen content. Such materials can be used to form carbon-based electrodes that enable higher energy density devices.

According to one aspect of the disclosure, activated carbon materials that are suitable for incorporation into carbon-based electrodes for use in ultracapacitors and other energy storage devices is derived from natural non-lignocellulosic materials. By using non-lignocellulosic materials as a precursor for the activated carbon material, economically viable, high power, high energy density devices can be formed. As used herein, unless expressly defined otherwise, "natural, non-lignocellulosic carbon precursor" means at least one natural, non-lignocellulosic carbon precursor.

According to a further aspect of the disclosure, a low oxygen content activated carbon material is prepared by heating a natural, non-lignocellulosic carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, removing the inorganic compound from the first carbon material to produce a second carbon material, and heating the second carbon material in an inert or reducing atmosphere to form a low oxygen content, activated carbon material.

An activated carbon material according to one embodiment can have a structural order ratio (SOR) less than or equal to 0.08, a nitrogen content greater than 0.1 wt. %, and an oxygen content less than 5 wt. %. An activated carbon material according to a further embodiment can have an oxygen content of less than 3 wt. % and a volumetric specific capacitance greater than 75 F/cm$^3$.

Additional features and advantages of the invention will be set forth in the detailed description which follows, and in part will be readily apparent to those skilled in the art from that description or recognized by practicing the invention as described herein, including the detailed description and the claims.

It is to be understood that both the foregoing general description and the following detailed description present embodiments of the invention, and are intended to provide an overview or framework for understanding the nature and character of the invention as it is claimed.

DETAILED DESCRIPTION

A method for producing an activated carbon material comprises heating a natural, non-lignocellulosic carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, removing the inorganic compound from the first carbon material to produce a second carbon material, and heating the second carbon material in an inert or reducing atmosphere to decrease the oxygen content in the second carbon material and form a low oxygen content, activated carbon material.

According to a further embodiment, a method for producing an activated carbon material comprises forming an aqueous mixture of a natural, non-lignocellulosic carbon precursor and an inorganic compound, heating the aqueous mixture in an inert or reducing atmosphere to form a first carbon material, removing the inorganic compound from the first carbon material to produce a second carbon material, and heating the second carbon material in an inert or reducing atmosphere to form a low oxygen content activated carbon material. The activated carbon material formed according to the foregoing methods can be used to form carbon-based electrodes for high energy density devices.

The carbon precursor is a natural non-lignocellulosic material. As defined herein, a substance that contains both cellulose and lignin is lignocellulosic and, for example, can include any of several closely-related substances constituting the essential part of woody cell walls of plants having cellulose intimately associated with lignin. The non-lignocellulosic carbon precursors are substantially free of at least one of lignin and cellulose. By substantially free is meant that at least one of the lignin and cellulose comprise, for example, at most 0.5, 1 or 2 wt. % of the composition of the carbon precursor.

In one embodiment, the natural non-lignocellulosic carbon precursor contains cellulose and is substantially free of lignin. In a further embodiment, the natural non-lignocellulosic carbon precursor contains lignin but is substantially free of cellulose. In a still further embodiment, the natural non-lignocellulosic carbon precursor is substantially free of both lignin and cellulose. The natural, non-lignocellulosic carbon precursor is not a synthetic material such as a synthetic resin.

Lignin, which is a Latin word for wood, is a compound that imparts rigidity to a plant. Lignin is a three-dimensional polymer having an amorphous structure and a high molecular weight. Of the three main constituents in plant fibers, lignin has the least affinity for water. In addition, lignin is a thermoplastic (i.e., lignin starts to soften at relatively low temperature and, with increasing temperature, will flow readily).

Cellulose is a basic structural component of plant fibers. Cellulose molecules can comprise, e.g., glucose units that are linked together in long chains, which in turn are linked together in bundles called microfibrils. Hemicelluloses are also found in plant fibers. Hemicelluloses are typically polysaccharides bonded together in relatively short, branching chains. Hemicelluloses, which are usually hydrophilic, are usually intimately associated with the cellulose microfibrils, embedding the cellulose in a matrix. Typical lignocellulosic fibers from agriculture are found, for example, in straws, hemp, flax, sisal, and jute.

The natural, non-lignocellulosic carbon precursor can be derived from an edible grain such as wheat flour, walnut flour, corn flour, corn starch, rice flour, and potato flour. Other natural, non-lignocellulosic carbon precursors include coffee grounds, potatoes, beets, millet, soybean, rape, barley, and cotton. The non-lignocellulosic material can be derived from a crop or plant that may or may not be genetically-engineered.

An exemplary non-lignocellulosic carbon precursor is wheat flour. Wheat flour is derived by milling wheat kernels, which are the seeds of the wheat plant. Wheat kernels have three main parts: the endosperm, the germ, and the bran. Whole wheat flour contains all three parts of the kernel, while white flour is milled from just the endosperm.

Compositionally, white flour contains mostly starch, although additional components are naturally present. The main components in white flour, with approximate percentages provided in parentheses, are starch (68-76%), proteins (6-18%), moisture (11-14%), gums (2-3%), lipids (1-1.5%), ash (<0.5%) and sugars (<0.5%).

Starch makes up the bulk of white flour. Even bread flour, considered "low" in starch, contains more starch than all other components combined. Starch is typically present in flour as small grains or granules. Chunks of protein bind starch granules together and hold them in place within the endosperm. Glutenin and gliadin, the gluten-forming proteins, typicall make up about 80 percent of the proteins in the endosperm. Other proteins in white flour include enzymes, such as amylase, protease, and lipase. Other carbohydrates in flour besides starch include gums, specifically pentosan gums. Pentosan gums are a source of soluble dietary fiber. Lipids include oils and emulsifiers, and ash includes inorganic matter (mineral salts), which can comprise iron, copper, potassium, sodium, and zinc.

The natural non-lignocellulosic carbon precursor can be heated at a temperature effective to carbonize the precursor material. Example carbonization temperatures are greater than about 450° C. (e.g., at least 450, 500, 550, 600, 650, 700, 750, 800, 850 or 900° C.). The inert or reducing atmosphere used during carbonization of the carbon precursor can comprise a gas or gas mixture of one or more of hydrogen, nitrogen, ammonia, helium or argon.

After carbonization of the carbon precursor, the resulting first carbon material is mixed with an inorganic chemical activating agent. Advantageously, the step of mixing can comprise mixing the first carbon material with an aqueous mixture of an inorganic compound. The inorganic compound used to activate the first carbon material can include an alkali hydroxide or chloride (e.g., NaOH, KOH, NaCl, KCl), phosphoric acid, or other suitable salt such as $CaCl_2$ or $ZnCl_2$.

During the mixing, the inorganic compound can be homogeneously or substantially homogeneously mixed with the first carbon material. In one approach, the inorganic compound is initially dissolved in a solvent such as water. The solution comprising the inorganic compound is then combined with the first carbon material, and the resulting mixture can be allowed to age for an amount of time effective to permit thorough mixing of the inorganic compound with the first carbon material. By way of example, the mixture can be aged for 0.5, 1, 2, 4, 8 or more hours (e.g., from 0.5 to 8 hours).

The first carbon material and inorganic compound can be combined in any suitable ratio. A ratio (wt. %/wt. %) of first carbon material to inorganic compound can range from about 10:1 to 1:10 (e.g., 9:1, 8:1, 7:1, 6:1, 5:1 4:1, 3:1, 2:1, 1:1, 1:2, 1:3, 1:4, 1:5, 1:6, 1:7, 1:8 or 1:9).

After the inorganic compound is mixed with the first carbon material and optionally aged, the mixture is heated at a temperature effective to incorporate the inorganic compound into the first carbon material. The mixture can be heated at a temperature from about 300° C. to 1000° C. in an inert or reducing environment for a predetermined time (e.g., 0.5, 1, 2, 4, 8, or more hours) in order to activate the carbon.

Following carbonization/activation, the activated carbon product can be washed to remove both the inorganic compound and any chemical species derived from reactions involving the inorganic compound, dried and optionally ground to produce material comprising a substantially homogeneous distribution of porosity.

A preferred solvent for extracting the inorganic compound is water. Optionally, the extraction solvent can include an acid. One process for removing the inorganic compound involves sequentially rinsing the activated carbon material with water and acid. A further process for removing the inorganic compound involves rinsing the activated carbon material with an aqueous acid mixture (e.g., mixture of acid and water). Acids used during the extraction can include hydrochloric acid. The process of extracting the inorganic compound forms a porous, activated carbon material, the pores being defined by the volume previously filled by the inorganic compound.

The activated carbon materials produced according to the disclosed methods may comprise microscale and/or mesoscale pores. As used herein, microscale pores have a pore size of 2 nm or less. Mesoscale pores have a pore size ranging from 2 to 50 nm. In an embodiment, the activated carbon comprises a majority of microscale pores. A micro-porous, activated carbon material can comprise greater than 50% microporosity (e.g., greater than 50, 55, 60, 65, 70, 75, 80, 85, 90 or 95% microporosity). The carbon material made using the method can have a specific surface area greater than about 300 $m^2/g$, i.e., greater than 350, 400, 500 or 1000 $m^2/g$.

The oxygen content within the activated carbon can be decreased using an additional heat treatment step. The oxygen content decreasing heat treatment step includes heating the activated carbon in an inert or reducing atmosphere to a temperature effective to decrease the oxygen content in the activated carbon. A furnace temperature that can be used in conjunction with an inert or reducing gas to decrease the oxygen content in the activated carbon ranges from about 200° C. to 1200° C. (e.g., 200, 250, 300, 350, 400, 450, 500, 550, 600, 650, 700, 750, 800, 850, 900, 950, 1000, 1050, 1100, 1150 or 1200° C.). Suitable inert gases include nitrogen ($N_2$) and argon (Ar). In embodiments, a reducing gas can include hydrogen ($H_2$), ammonia ($NH_3$) or a gas mixture comprising hydrogen and nitrogen (i.e., forming gas). The hydrogen content in the gas mixture can be 6% or less (e.g., less than 6, 5, 4, 3, 2, or 1% $H_2$). According to an embodiment, a low oxygen content activated carbon has an oxygen content of less than 5 wt. % (e.g., less than 5, 4.5, 4, 3.5, 3, 2.5, 2, 1.5, 1 or 0.5 wt. %).

Additional aspects of activated carbons are disclosed in commonly-owned U.S. patent application Ser. No. 12/335,044, the contents of which are incorporated by reference herein.

Once formed, the low oxygen content activated carbon can be incorporated into a carbon-based electrode. A method for producing a carbon-based electrode comprises heating a natural, non-lignocellulosic carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, removing the inorganic compound from the first carbon material to produce a second carbon material, heating the second carbon material in an inert or reducing atmosphere to form a low oxygen content activated carbon material, and forming a carbon-based electrode from the low oxygen content activated carbon material.

In a typical electric double layer capacitor (EDLC), a pair of carbon-based electrodes is separated by a porous separator and the electrode/separator/electrode stack is infiltrated with a liquid organic or inorganic electrolyte. The electrodes comprise activated carbon powder that has been mixed with other additives (e.g., binders) and compacted into a thin sheet and laminated to a conductive metal current collector backing.

By way of example, a carbon paper having a thickness in the range of about 100-300 micrometers can be prepared by rolling and pressing a powder mixture comprising 60-90 wt. % low oxygen content activated carbon, 5-20 wt. % carbon black and 5-20 wt. % PTFE. Carbon sheets can be stamped or otherwise patterned from the carbon paper and laminated to a conductive current collector to form a carbon-based electrode. The carbon-based electrode can be incorporated into an energy storage device. During use, an electric double layer can form via the stored charge that accumulates on opposing electrodes. The amount of charge stored in the electric double layer impacts the achievable energy density and power density of the capacitor.

The performance (energy and power density) of an ultracapacitor depends largely on the properties of the activated carbon material that makes up the electrodes. The properties of the activated carbon material, in turn, can be gauged by evaluating the structural order of the carbon atoms, the porosity and pore size distribution of the material, the nitrogen content, the oxygen content, and the electrical properties of the activated carbon material when incorporated into a carbon-based electrode. Relevant electrical properties include the area-specific resistance, and the specific capacitance.

The carbon structural order can be determined from powder samples using low angle X-ray diffraction (XRD). To prepare samples for XRD, powdered activated carbon material is lightly ground in an agate mortar and pestle. The ground sample is pressed into a Bruker-AXS powder sample holder. X-ray diffraction results are obtained using copper $K_\alpha$ radiation (1.5406 Å) on a Bruker-AXS D4 Endeavor X-ray diffractometer over a 2-theta angular range of 0.5-20 degrees with a step size of 0.02 degrees and a dwell time of 1 second.

The carbon structural ratio is computed as a normalized intensity of the X-ray reflection at 60 Angstroms. Specifically, the intensity of the diffracted beam at a d-spacing of 60 Angstroms ($I_{60}$) is divided by the positive difference between the intensity at a d-spacing of 176 Angstroms ($I_{176}$) and the intensity at a d-spacing of 15 Angstroms ($I_{15}$). Thus, the carbon structural order ratio is defined herein as $SOR=I_{60}/(I_{176}-I_{15})$.

Electrical properties of activated carbon materials can be evaluated by measuring the characteristics of carbon-based electrodes. The carbon-based electrodes evaluated herein include 85 wt. % activated carbon material, 5 wt. % conductive carbon (e.g., Black Pearls®, which is marketed by Cabot Corporation, Boston, Mass.), and 10 wt. % Teflon® (PTFE).

The specific capacitance (volumetric capacitance and gravimetric capacitance) of the activated carbon material can be measured by forming the material into a carbon-based electrode. A button cell can be formed by punching carbon electrodes having a diameter of 0.625 inches from sheets of the electrode material. A separator is placed between identical carbon electrodes which, in turn, are sandwiched between two conductive carbon-coated aluminum current collectors. A thermoset polymer ring is formed around the periphery of the carbon electrodes to seal the cell, which is filled with an organic electrolyte such as 1.5M tetraethylammonium-tetrafluoroborate (TEA-TFB) in acetonitrile.

According to a further embodiment, an electrochemical cell comprises a first electrode comprising a low oxygen content activated carbon material, a porous separator, and a pair of electrically conductive substrates, wherein the porous separator is disposed between the first electrode and a second electrode, and the first and second electrodes are each in electrical contact with a respective electrically conductive substrate.

The capacitance of the cell ($C_{cell}$) is measured from galvanostatic discharge. The cell is first charged at a constant current (icharge) to a desired potential (e.g., 2.7 V), which is followed by a constant current discharge (idischarge). According to Ohm's law, capacitor current (i) is proportional to the time derivative of capacitor voltage according to:

$$i = C\frac{dV}{dt} \quad (1)$$

where C is capacitance, V is the cell voltage (in Volts) and t is time (in seconds).

By measuring the slope from the galvanostatic discharge curve (cell voltage vs. time), the cell capacitance (in Farads) can then be calculated as:

$$C_{cell} = \frac{i_{discharge}}{dV/dt} \quad (2)$$

The cell capacitance is the harmonic sum of two individual capacitances represented by the electrochemical double layer capacitance of each of the carbon electrodes (capacitors in series). This relationship can be expressed as:

$$\frac{1}{C_{cell}} = \frac{1}{C_1} + \frac{1}{C_2} \qquad (3)$$

where $C_1$ and $C_2$ are the double layer capacitances of the individual carbon electrodes in the cell.

The magnitudes of these capacitances can be correlated to the volumetric specific capacitance of the carbon electrodes as:

$$C_1 = C_{sp,1} \times V_1 \qquad (4)$$

$$C_2 = C_{sp,2} \times V_2 \qquad (5)$$

where $C_{sp,1}$ and $C_{sp,2}$ are specific capacitances of the individual carbon electrodes (in F/cm$^3$) and $V_1$ and $V_2$ are the corresponding electrode volumes. Because the test cell uses electrodes having identical size and composition, $C_1=C_2$, $C_{sp,1}=C_{sp,2}$ ($=C_{sp}$) and $V_1=V_2$ ($=V_{total}/2$, where $V_{total}$ is the total volume (cm$^3$) of carbon electrodes in the cell). Equations (3), (4) and (5) can be combined to give a volumetric capacitance, $C_{sp}$ as:

$$\frac{1}{C_{cell}} = \frac{2}{C_{sp} \times V_{total}} + \frac{2}{C_{sp} \times V_{total}} \qquad (6)$$

or, $$C_{sp} = \frac{4 \times C_{cell}}{V_{total}} \qquad (7)$$

The nitrogen content (wt. %) of select samples was determined using a Thermo Flash analyzer. The technique is the classical Dumas method, which uses thermal conductivity detection (TCD), and is described by ASTM D5373 and ASTM D5291. Weighed samples are combusted in oxygen at 950° C. The combustion products (including $N_2$ and $NO_x$) are swept with a helium carrier gas through combustion catalysts, scrubbers, and through a tube filled with reduced copper. The copper removes excess oxygen and reduces $NO_x$ to $N_2$. The $N_2$ is then separated from other gases on a chromatography column and measured with TCD. Oxygen content (wt. %) is measured according to ASTM D5622 (Huffman Laboratories, Inc.).

Activated carbon produced by the foregoing method offers significantly higher energy storage capacity in EDLCs compared to major commercial carbons. For example, when the low oxygen content activated carbon according to the present disclosure is incorporated into a carbon-based electrode also comprising carbon black and PTFE, the gravimetric specific capacitance is greater than 110 F/g (e.g., 110, 120, 130, 140, 150, 160, 170 or 180 F/g) and the volumetric specific capacitance is greater than 70 F/cm$^3$ (e.g., 70, 75, 80, 85, 90, 92, 94, 96, 98 or 100 F/cm$^3$).

The energy storage device can include an ultracapacitor. Ultracapacitors can have a jelly roll design, prismatic design, honeycomb design, or other suitable configuration. A carbon-based electrode can be incorporated into a carbon-carbon ultracapacitor or into a hybrid ultracapacitor. In a carbon-carbon ultracapacitor, both of the electrodes are carbon-based electrodes. In a hybrid ultracapacitor, one of the electrodes is carbon-based, and the other electrode can be a pseudo capacitive material such as lead oxide, ruthenium oxide, nickel hydroxide, or another material such as a conductive polymer (e.g., parafluorophenyl-thiophene). In addition to its use in energy storage devices, the low oxygen content activated carbon can be used as a catalyst support or as media for adsorption/filtration.

EXAMPLES

The invention will be further clarified by the following examples.

Example 1

Wheat flour (3000 g) is placed in a graphite crucible and heated in a retort furnace (CM Furnaces model 1216FL). The furnace temperature is increased at a heating rate of 150° C./hr from room temperature to 800° C., maintained at 800° C. for 2 hrs, and then allowed to cool down naturally to 70° C. or less. During the foregoing heating/cooling cycle, the furnace is purged with $N_2$.

As a result of heating under flowing $N_2$, the wheat flour is carbonized and converted to a first carbon material. The first carbon material can be ground to a powder using a hammer pound, pulverization and vibramilling. The ground carbon powder can have a particle size ($d_{50}$) of 10 micrometers or less (e.g., 1, 2, 5 or 10 micrometers).

The powdered first carbon material (300 grams) is mixed with 1500 grams of a 45 wt. % aqueous solution of KOH. The resulting mixture is stirred and heated at about 100° C. on a hot plate until the liquid is removed and a solid cake is formed. The cake can be broken into smaller pieces by mechanical force.

The carbon/KOH mixture is placed in SiC crucibles (Hexyloy® SA grade) and heated in a retort furnace. The furnace temperature is increased at a heating rate of 150° C./hr from room temperature to 750° C., maintained at 750° C. for 2 hours, and then allowed to cool down naturally to a temperature of about 100° C. During this heating/cooling cycle, the furnace is purged with $N_2$. By heating the carbon/KOH mixture, the KOH can be incorporated into the first carbon material During cooling, once the furnace temperature reaches 100° C., the furnace temperature is maintained at 100° C. for 3 additional hours during which time the furnace is purged with $N_2$ saturated with water vapor. Nitrogen gas saturated with water vapor can be produced by bubbling $N_2$ gas through 95° C. de-ionized water. The furnace is then allowed to cool down naturally to 70° C. or lower.

The resulting activated carbon can then be washed to remove excess potassium, potassium compounds, and other impurities. Washing can comprise rinsing the activated carbon with water or, according to an embodiment, alternately rinsing the activated carbon with water and a mixture of water and acid. One example washing sequence is disclosed below.

In a first washing step, the activated carbon is combined with 3000 mL of de-ionized water and the mixture is stirred and heated on a hot plate at a temperature of from about 90 to 100° C. for 30 minutes. Solid material (i.e., carbon) is separated from the liquid by vacuum-assisted filtration.

In a second washing step, the previously-obtained carbon material is combined first with 1980 mL of de-ionized water and then 990 mL of 37% aqueous HCl. The mixture is stirred and heated on a hot plate at a temperature of from about 90 to 100° C. for 60 minutes, after which the solid material is separated from the liquid by vacuum-assisted filtration.

In a third washing step, the previously-obtained carbon material is combined with 3000 mL of DI water. The mixture is stirred and heated on a hot plate at a temperature of from about 90 to 100° C. for 60 minutes. The carbon material is then separated from the liquid by vacuum-assisted filtration.

The third washing step is then repeated until the pH of the effluent liquid is the same as that of the de-ionized water used for washing. Finally, the activated carbon is dried in a vacuum oven at 125° C. for 18 hours to produce a second carbon material. The second carbon material comprises activated carbon powder.

In order to decrease the oxygen content in the second carbon material, the second carbon material is treated with an additional heat treatment, which includes heating the second carbon material in an inert or reducing atmosphere.

In an embodiment, the second carbon material is placed in SiC crucibles and loaded into a furnace (CM Furnaces model 1216FL or 1212FL). The furnace temperature is increased at a heating rate of 150° C./hr to a temperature of about 800° C., maintained at temperature for 2 hours, and then allowed to cool down naturally. During the foregoing heating/cooling cycle, the furnace is constantly purged with either $N_2$ or a mixture of $H_2$ and $N_2$.

Upon cooling, once the furnace temperature has reached 100° C., it is maintained at 100° C. for 3 additional hours during which time the furnace is purged with $N_2$ saturated with water vapor. The furnace is then allowed to cool down naturally to 70° C. or lower. The resulting activated carbon product can be dried in a vacuum oven at 125° C. for 18 hours.

Example 2

The specific capacitance and oxygen content of three different activated carbon materials made according to Example 1 are measured. The initial sample corresponds to the second carbon material of Example 1 (obtained prior to the oxygen-reduction heat treatment). Two additional samples are obtained by heating the second carbon material in either an inert ($N_2$) or reducing (1% $H_2/N_2$) atmosphere.

Capacitance values are obtained by incorporating the activated carbon into a button cell electrode. To form the button cell, activated carbon is combined with carbon black (Black Pearl 2000) and PTFE. The carbon black serves as a conductive additive and the PTFE serves as a binder. The activated carbon, carbon black and PTFE are blended in the proportion of 85:5:10 by weight and rolled into electrodes. A solution of 1.5 M tetraethylammonium tetrafluoroborate (TEA-TFB) in acetonitrile is used as the electrolyte.

Specific capacitance and oxygen content data are summarized in Table 1. In the Tables below, $C_{sp,m}$ refers to the gravimetric specific capacitance, and $C_{sp,v}$ refers to the volumetric specific capacitance.

TABLE 1

Activated carbon properties following heat treatment in $N_2$ or $H_2/N_2$

| Carbon Material | $C_{sp,m}$ [F/g] | $C_{sp,v}$ [F/cm$^3$] | Oxygen content [wt. %] |
|---|---|---|---|
| Prior to heat-treatment | 175.0 | 97.8 | 4.64 |
| $N_2$ at 800° C., 2 hr | 163.7 | 90.1 | 3.00 |
| 1% $H_2/N_2$ at 800° C., 2 hr | 160.3 | 92.3 | 1.64 |

Referring to the data in Table 1, prior to the post-activation heat treatment, the activated carbon has an oxygen content of 4.6 wt. %. A post-activation heat treatment at 800° C. in nitrogen decreases the oxygen content to 3.00 wt. %, while a post-activation heat treatment at 800° C. in 1% $H_2/N_2$ decreases the oxygen content to 1.64 wt. % without signi-cantly decreasing the specific capacitance. In embodiments, the oxygen content is less than 3 wt. % (e.g., less than 2 wt. %).

It is believed that further decreases in the oxygen content can be achieved by increasing the temperature of the post-activation heat treatment. It is also believed, however, that post-activation heat treatment temperatures above about 800° C. may result in an undesirable decrease in the specific capacitance due to damage to the carbon pore structure at such temperatures. While increasing the post-activation heat treatment temperature above about 800° C. may have a deleterious effect on capacitance, it has been discovered that moderate-to-high-temperature post-activation heat treatments that are conducted in a reactive gas environment can decrease oxygen content in the activated carbon without significantly degrading the capacitance.

Example 3

An activated carbon sample is heat treated in 1% $H_2/N_2$ at three different temperatures. As shown in Table 2, the resulting oxygen content is 3.28, 1.53 and 1.06 wt. % after heat treatment at 400° C., 600° C. and 800° C. The specific capacitance remained virtually unchanged as a result of the 400° C. and 600° C. post-activation heat treatments, while the capacitance decreased following the 800° C. post-activation heat treatment.

TABLE 2

Activated carbon properties following heat treatment in $H_2/N_2$

| Carbon Material | $C_{sp,m}$ [F/g] | $C_{sp,v}$ [F/cm$^3$] | Oxygen content [wt. %] |
|---|---|---|---|
| Prior to heat-treatment | 177.8 | 94.0 | 5.00 |
| 1% $H_2/N_2$ at 400° C., 2 hr | 177.2 | 94.3 | 3.28 |
| 1% $H_2/N_2$ at 600° C., 2 hr | 173.4 | 93.3 | 1.53 |
| 1% $H_2/N_2$ at 800° C., 2 hr | 159.5 | 87.8 | 1.06 |

Example 4

An activated carbon sample is heat treated in 1% $H_2/N_2$ at 700° C. Compared to the non-heat-treated sample, the oxygen content decreases from 4.30 wt. % to 1.58 wt. % while the specific capacitance decreases by less than 3%.

TABLE 3

Heat treatment in $H_2/N_2$ at 700° C.

| Carbon Material | $C_{sp,m}$ [F/g] | $C_{sp,v}$ [F/cm$^3$] | Oxygen content [wt. %] |
|---|---|---|---|
| Prior to heat-treatment | 175.5 | 93.0 | 4.30 |
| 1% $H_2/N_2$ at 700° C., 2 hr | 172.4 | 90.4 | 1.58 |

Comparative Example 1

For comparison, a commercially-available carbon material (Kuraray YP-50F) is characterized in the manner of the foregoing examples. The oxygen content in the as-received commercially-available carbon is 1.85 wt. %. When incorporated into button cell electrodes, however, the capacitance measurements for the commercially-available carbon reveal values that are significantly less than those achieved for the carbon materials according to the present disclosure. The gravimetric specific capacitance ($C_{sp,m}$) is 123 F/g, and the volumetric specific capacitance ($C_{sp,v}$) is 67 F/cm$^3$.

This disclosure provides activated carbon materials derived from non-lignocellulosic sources for EDLC applications. The activated carbon materials can be characterized by high microporosity and low oxygen content. Such carbons provide high specific capacitance and in turn, high energy storage capacity and long term stability in EDLCs. Methods for making such activated carbon materials are also disclosed.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for producing an activated carbon material comprising:
   heating a natural, non-lignocellulosic carbon precursor in an inert or reducing atmosphere to form a first carbon material;
   mixing the first carbon material with an inorganic compound to form an aqueous mixture;
   drying the aqueous mixture to form a dried mixture and heating the dried mixture in an inert or reducing atmosphere to incorporate the inorganic compound into the first carbon material;
   removing the inorganic compound from the first carbon material to produce a second carbon material; and
   heating the second carbon material in an inert or reducing atmosphere to form a low oxygen content activated carbon material wherein the oxygen content is less than 5 wt. %.

2. A method according to claim 1, wherein the non-lignocellulosic carbon precursor is selected from the group consisting of wheat flour, walnut flour, corn flour, corn starch, rice flour, potato flour, coffee grounds, potatoes, beets, millet, soybean, rape, barley, and cotton.

3. A method according to claim 1, wherein the inorganic compound is selected from the group consisting of an alkali hydroxide, alkali chloride, phosphoric acid, calcium chloride and zinc chloride.

4. A method according to claim 1, wherein the inorganic compound is selected from the group consisting of sodium hydroxide, potassium hydroxide, sodium chloride and potassium chloride.

5. A method according to claim 1, wherein heating the dried mixture comprises heating at a temperature of from about 300° C. to 1000° C.

6. A method according to claim 1, wherein the removing comprises sequentially rinsing the first carbon material with water and diluted acid.

7. A method according to claim 1, wherein the second carbon material is heated at a temperature of from about 200° C. to 1200° C.

8. A method according to claim 1, wherein the second carbon material is heated in an environment comprising nitrogen gas.

9. A method according to claim 1, wherein the second carbon material is heated in an environment comprising forming gas.

10. A method according to claim 1, wherein the second carbon material is heated in an environment comprising forming gas having a hydrogen gas content of 6% or less.

11. A method according to claim 1, wherein the low oxygen content activated carbon material comprises a majority of microscale pores.

12. A method for producing an activated carbon material comprising:
   forming an aqueous mixture of a natural, non-lignocellulosic carbon precursor and an inorganic compound;
   heating the aqueous mixture in an inert or reducing atmosphere to form a first carbon material;
   removing the inorganic compound from the first carbon material to produce a second carbon material; and
   heating the second carbon material in an inert or reducing atmosphere to form a low oxygen content activated carbon material wherein the oxygen content is less than 5 wt. %.

* * * * *